United States Patent [19]

Sato et al.

[11] Patent Number: 4,471,384
[45] Date of Patent: Sep. 11, 1984

[54] OPTICAL READER

[75] Inventors: Masuji Sato, Kawasaki; Fumiaki Yamada, Yokohama; Toshiaki Naka, Machida, all of Japan

[73] Assignee: Fujitsu Limited, Kawasaki, Japan

[21] Appl. No.: 392,174

[22] Filed: Jun. 25, 1982

[30] Foreign Application Priority Data

Jun. 26, 1981 [JP] Japan ............................. 56-98362
Sep. 9, 1981 [JP] Japan ............................ 56-140854
Sep. 10, 1981 [JP] Japan ........................... 56-141646

[51] Int. Cl.³ .................................................. H04N 1/12
[52] U.S. Cl. .................................. 358/282; 235/469; 358/293; 358/294
[58] Field of Search ................... 358/282, 293, 294; 382/65; 235/469, 465

[56] References Cited

U.S. PATENT DOCUMENTS

| | | | |
|---|---|---|---|
| 3,967,893 | 7/1976 | Majewicz | 355/4 |
| 4,047,023 | 9/1977 | Key | 235/469 |
| 4,317,137 | 2/1982 | Tompkins | 358/293 |
| 4,402,017 | 8/1983 | Takei | 358/293 |

Primary Examiner—Howard W. Britton
Attorney, Agent, or Firm—Staas & Halsey

[57] ABSTRACT

An optical reader which comprises: at least one yellow LED array as a light source for lighting original material; an optical lens or fibers for guiding the light reflected from the original material; and an image sensor which changes the reflected light to signal waves. In embodiments of the reader, the light source includes both a yellow LED array and a green LED array with colored filters either provided over the LED arrays or on the optical lens or fibers.

9 Claims, 23 Drawing Figures

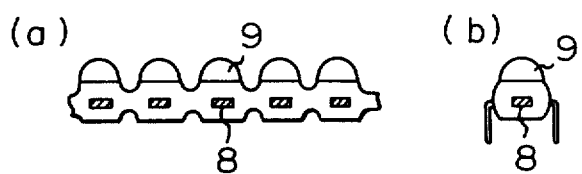
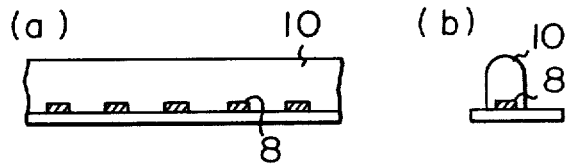
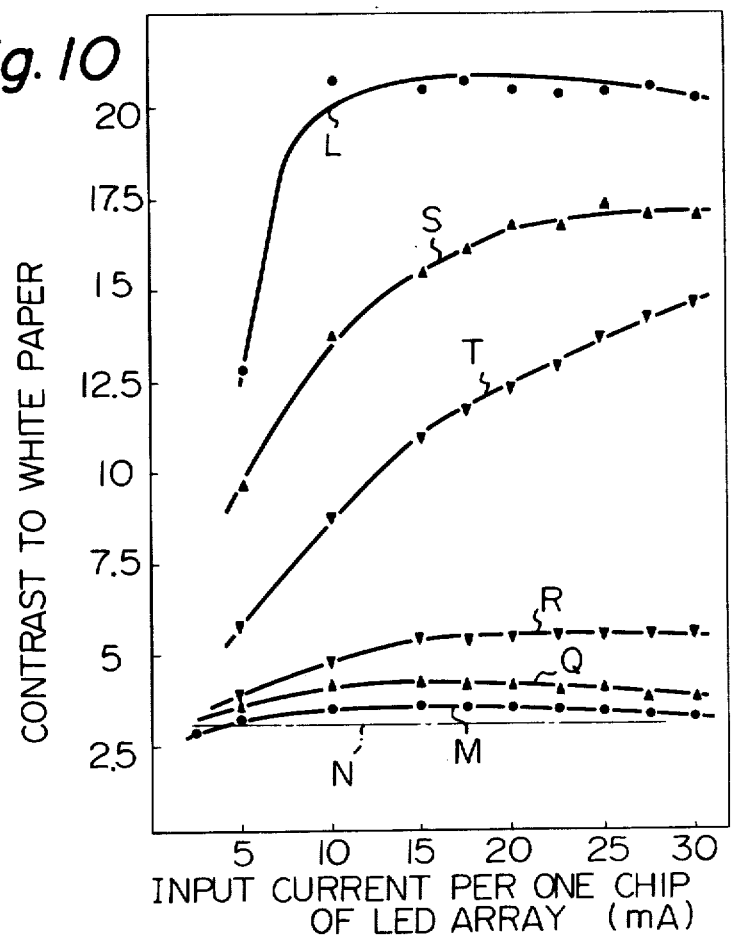

OPTICAL READER

FIELD OF THE INVENTION

The present invention relates to improvements in an optical reader.

BACKGROUND OF THE INVENTION

A facsimile is used to promptly forward an image of graphic material to a remote point. The image of the original material is changed to signal waves and is sent from the dispatching side of the facsimile to a facsimile receiver. The signal waves are changed to an image of the original material in the receiving side of the facsimile.

An optical reader is used to change the image of the original material to signal waves. In the conventional optical reader, the light source for lighting the original material comprises arrays of green light-emitting diodes (LEDs) having a center wavelength of 555 nm so that sufficient contrast of the original material can be obtained so as to clearly distinguish material in red. However, the luminous intensity of a green LED is weak. The length of one LED array and the number of LEDs contained therein correspond to the width of the original material. Two LED arrays are necessary in order to light the original material with a luminous intensity sufficient for the photosensor to recognize the original material. In addition, a high input current fed to the light source is necessary to enhance illumination of the original material. Therefore, excessive heat is generated in the LED arrays and the photosensor is heated, and, as a result, the sensing ability of the sensor is degraded due to an increase in the resistance-in-light of the photosensor and drift of the output voltage thereof.

SUMMARY OF THE INVENTION

The present invention aims to obviate the above-mentioned problems.

An optical reader according to the present invention comprises: a light source comprising at least one array of LEDs for lighting the original material; an optical guide means for guiding the reflected light on the original material; and an image sensor which changes said reflected light to signal waves. More particularly, the light source of the optical reader comprises an array of yellow LEDs.

BRIEF DESCRIPTION OF THE DRAWINGS

FIG. 8(a) is a front view of an example of a light source according to the present invention.

FIG. 8(b) is a side view of the light source of FIG. 8(a).

FIG. 9(a) is a front view of another example of a light source according to the present invention.

FIG. 9(b) is a side view of the light source of FIG. 9(a).

FIG. 10 is a graph showing contrast characteristics of different colors in light of the light source according to the present invention relative to the input current.

DETAILED DESCRIPTION OF THE PREFERRED EMBODIMENTS

Figure 1:
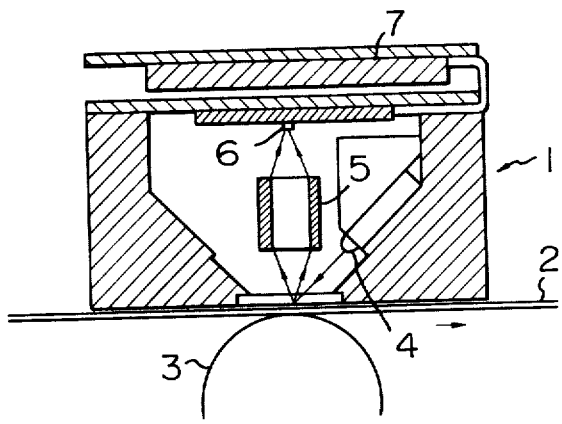
FIG. 1 is a sectional view of the main part of an optical reader according to the present invention.

The main part of an optical reader in the dispatching side of a facsimile is illustrated in FIG. 1. The image of the original material is changed to signal waves by the optical reader. The optical reader comprises an image sensor unit which is indicated by numeral 1. The image sensor unit 1 comprises: a feed roller 3 for feeding an original material 2; a light source 4 which comprises an array of LEDs; an optical guide means 5 which comprises self-focusing glass fibers (such as marketed under the trade name of "Selfoc Lens Array"); a photodetector 6 which comprises an array of photoelectric transferring diodes; and an actuating circuit 7 of the photodetector 6. The original material 2 is moved toward the right in the direction of the arrow in FIG. 1 under the image sensor unit 1 by the feed roller 3. During this movement, the original material 2 is lighted by the light source 4, and the reflected light is guided to the photodetector 6 through the optical guide means 5. There, the light is transformed to signal waves.

Figure 2:
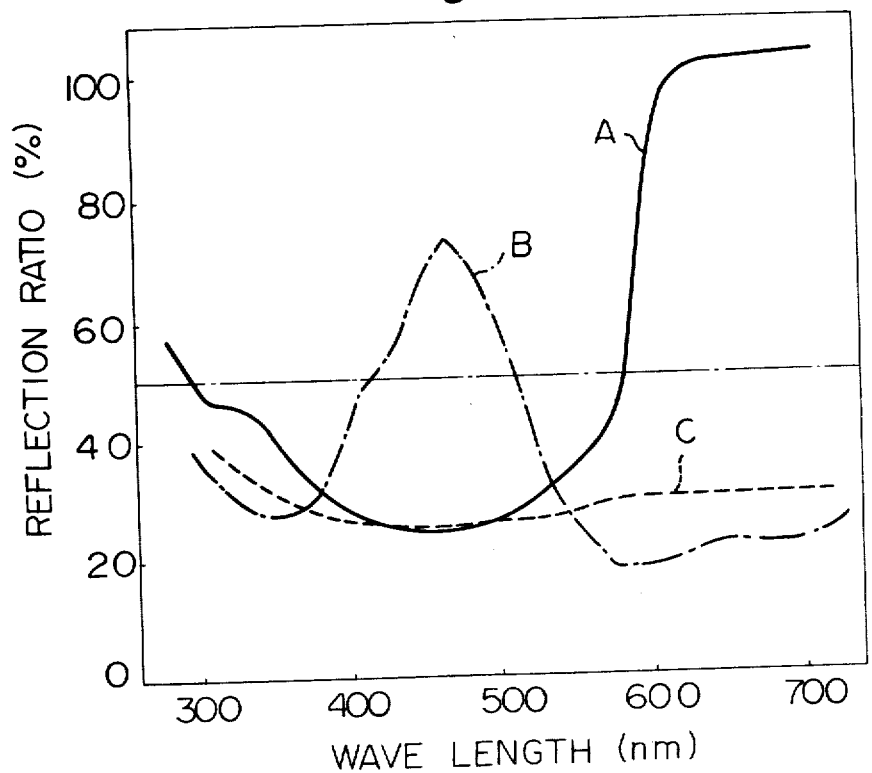
FIG. 2 is a graph showing reflection characteristics of different colors relative to wavelength.

The optical reader must discriminate material which usually appears in black, red, and/or blue on white paper. In order to ensure reliable discrimination of material, black, red, or blue colors should never or only slightly reflect the light from the light source 4 while white paper should fully reflect the light from the light source 4. The reflection characteristics of various colors are depicted in the graph of FIG. 2. In FIG. 2, the abscissa represents the wavelength in nm (nanometers), the ordinate represents the reflection ratio (%), the solid line A represents the characteristic of reddish orange (color code No. 6055 of Toyo Ink Co.), the dash-dot line B represents the characteristic of blue (color code No. 6215), and the dotted line C represents the characteristic of black (color code No. 6301). The optical reader judges the original material as being white if its reflection ratio is more than 50%, while it judges the original material as being black if its reflection ratio is less than 50% so as to create a binary signal. When the original material is lighted by an orange light having a center wavelength of 605 nm, the original material in red or reddish orange (line A) is judged as being white since its reflection ratio in the orange light is more than 50%. Therefore, a light having a center wavelength of more than about 600 nm cannot be used as the light source. When the original material is lighted by yellow LEDs having a center wavelength of 570 nm or by green LEDs having a center wavelength of 555 nm, each of the original materials in red, blue, and black (lines A, B, and C) is judged as being black. Therefore, a yellow LED or a green LED can be used as the light source. When the original material is lighted by a light having a center wavelength of less than 510 nm, the original material in blue (line B) is judged as white. Therefore, this light cannot be used as the light source. The wavelength of the light for lighting the original material should be between about 520 nm and 590 nm.

Figure 3:
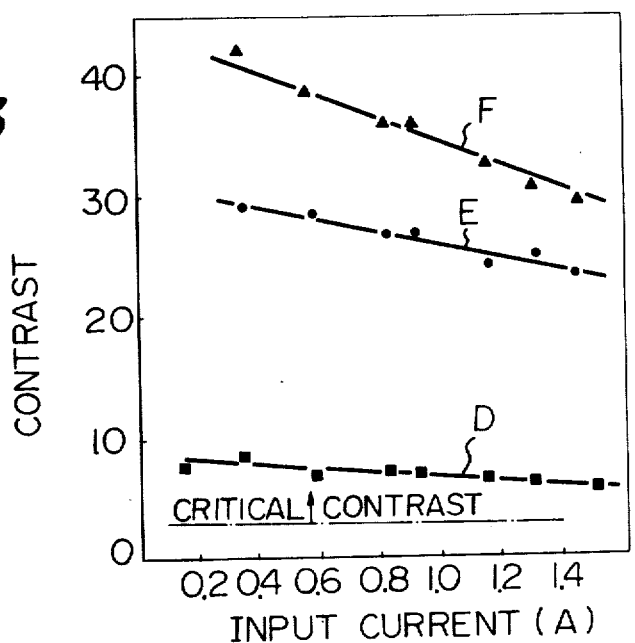
FIG. 3 is a graph showing contrast characteristics of different colors in a yellow light relative to input current.
Figure 4:
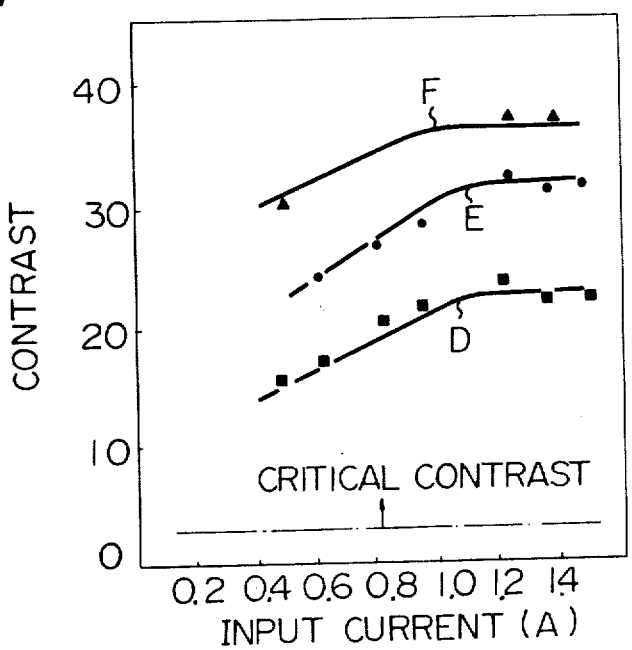
FIG. 4 is a graph showing contrast characteristics of different colors in a green light relative to input current.

The contrast characteristic of different colors relative to the input current is graphically depicted in FIGS. 3 and 4. In FIG. 3, the light source is a yellow LED array having a center wavelength of 570 nm. The array contains 88 LEDs. In FIG. 4, the light source is a green LED array having a center wavelength of 555 nm. The array contains 88 LEDs. The abscissa represents the input current, the ordinate represents the contrast of the original material, line D represents the contrast of red to white, line E represents the contrast of black to white, and line F represents the contrast of blue to white. In FIGS. 3 and 4, the lines D, E, and F are above the critical contrast level (about 3) for discriminating the original material. Therefore, either yellow or green LEDs can be used as the light source from the viewpoint of the contrast characteristics of the original material.

Figure 5:
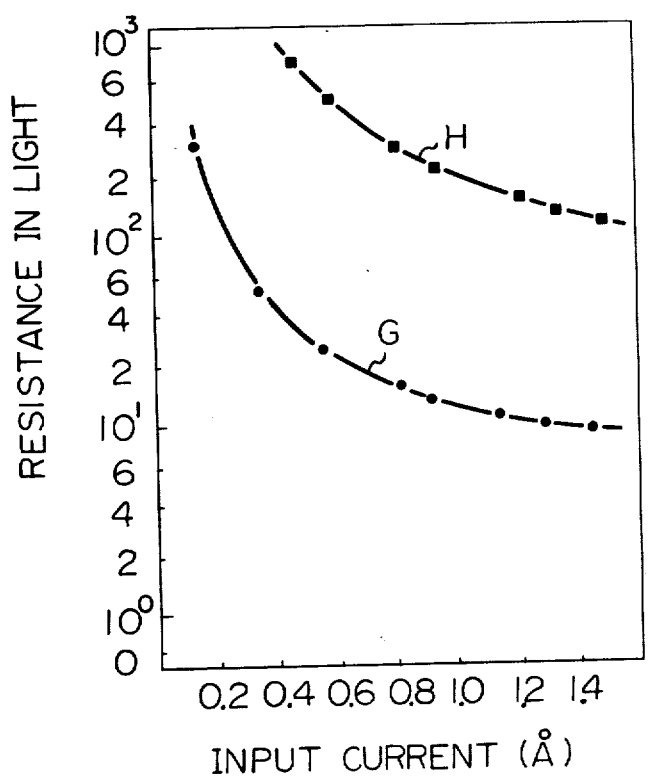
FIG. 5 is a graph showing characteristics of resistance of the photosensor in light of different colors relative to the input current.

The photodetector 6 of the optical reader represents a different resistance characteristic in a green light as compared with a yellow light, as shown in FIG. 5. In FIG. 5, the abscissa represents the input current fed to the light source, the ordinate represents the resistance-in-light of the photodetector, line G represents the light of a yellow LED having a center wavelength of 570 nm, and line H represents the light of a green LED having a center wavelength of 555 nm. As can be seen from the graph, the resistance of the photodetector 6 in a yellow light is much less than in a green light.

Figure 6:
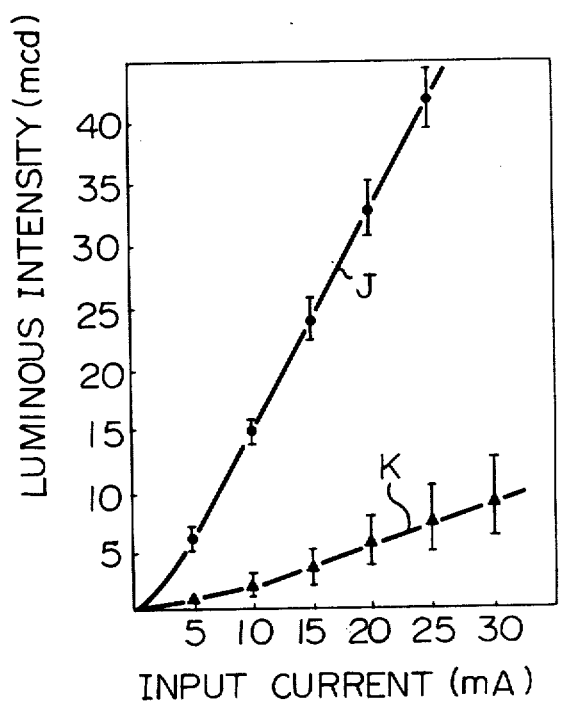
FIG. 6 is a graph showing characteristics of luminous intensity of yellow and green LEDs relative to input current.

The luminous intensity of an LED is graphically depicted in FIG. 6. In FIG. 6, the abscissa represents the input current fed to the LED, the ordinate represents the luminous intensity of the LED, line J represents a yellow LED having a center wavelength of 570 nm, and line K represents a green LED having a center wavelength of 555 nm. As can be seen from the graph, the luminous intensity of the yellow LED is more than five times the luminous intensity of the green LED at the same input current.

The present invention was made considering the above-mentioned data. The optical reader of the present invention comprises as a light source a yellow LED array having a center wavelength of 570 nm and a half width of 30 μm.

The advantages of using yellow LEDs are as follows. Only one LED array is sufficient as the light source due to the high luminous intensity of a yellow LED, while two green LED arrays are required in the optical reader of the prior art. Therefore, assembling and adjusting the light source can be easily carried out, and both labor costs and the cost of the parts can be decreased. The power consumption is decreased to about one third that of conventional green LEDs and, therefore, the generation of heat is decreased, whereby degradation of the photodetector or image sensor, such as weakening of the luminous intensity or lowering of the output power thereof, is avoided.

As mentioned above, use of a yellow LED array having a center wavelength of 560~580 nm as the light source provides for simple construction of an optical reader which is low in cost and low in consumption of power. LEDs, such as a yellow LED having a 570 nm wavelength and a green LED having a 555 nm wavelength, are on the market. As is graphically depicted in FIG. 6, the luminous intensity of such a yellow LED (line J) is more than five times the luminous intensity of a green LED (line K). The necessary input current fed to a yellow LED in order to obtain the same luminous intensity as that of a green LED is about one fifth the input current of a green LED. Therefore, the consumption of power of a yellow LED is much less than that of a green LED.

Figure 7:
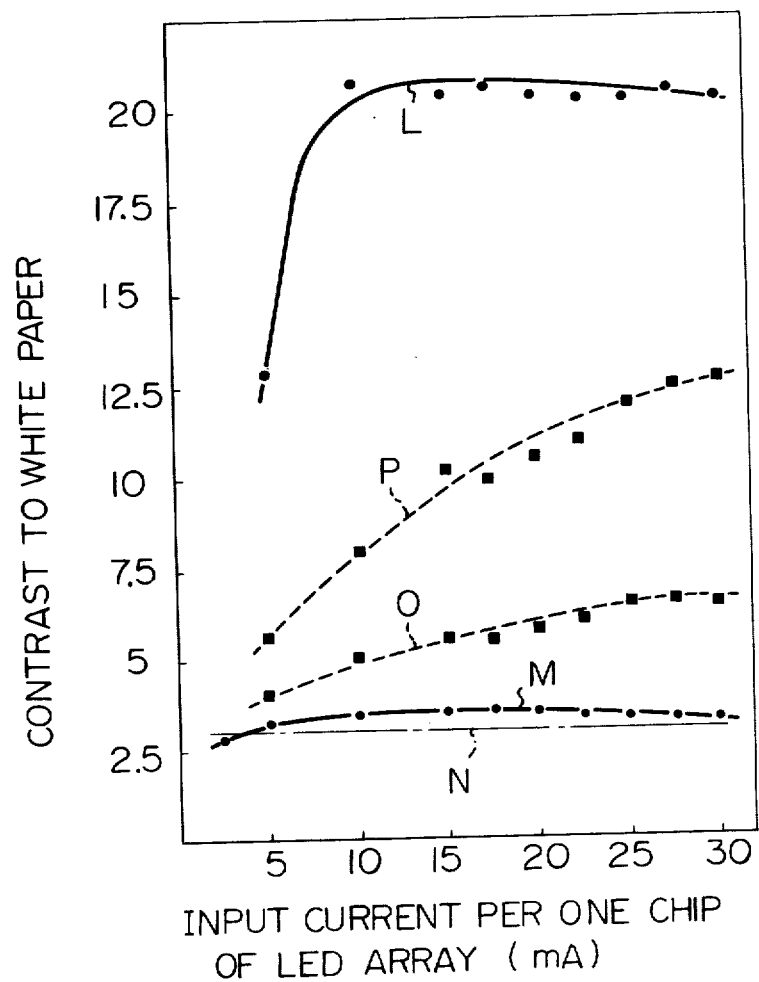
FIG. 7 is a graph showing contrast characteristics of different colors in light of a conventional light source relative to input current.

The resistance-in-light of a photodetector made of cadmium selenium (CdSe) is graphically illustrated in FIG. 5. The resistance of the photodetector in the light of a yellow LED (line G) is lower than the resistance in the light of a green LED (line H). Therefore, yellow is superior to other colors as the color of the light source. However, it has drawbacks regarding the contrast of red, i.e., the contrast defined by the output of white paper/output of red original material=resistance-in-light (red original)/resistance-in-light (white paper). The contrast of red in the light of yellow LEDs is small, causing incorrect discrimination of the original material since the margin of the detector output for making a binary signal is small. This is especially a problem in discriminating a stamp of reddish orange or a bright red color near orange. The contrast of the original material to white color paper is determined by dividing the resistance-in-light of the photodetector in the light reflected by the original material by the resistance-in-light of the photodetector in the reflected light by the white paper. Such contrast of the original material to the white paper relative to the input current to one chip of the LED array of the light source is illustrated in FIG. 7. Line L represents the contrast of black (color code No. 6301) to Toyo Ink Co.) in a yellow light, line M represents the contrast of red near orange (color code No. 6055) in a yellow light, line O represents the contrast of the red of line M in a green light, and line P represents the contrast of black in a green light. As can be seen from the graph, in a yellow light, the contrast of black (line L) is large enough (about 20) to enable discrimination of the original material. However, the contrast of red (line M) is only slightly over the critical level (line N). Thus, the margin of contrast is small. The contrast of red in a green light (line O) is larger than that in a yellow light (line M), since green is a complementary color of red. However, the resistance-in-light of the photodetector in a green light is large, as can be seen from FIG. 5. Therefore, in a light source comprising green LEDs, two arrays of LEDs and heat radiation means for increasing the input current are necessary in order to lower the resistance-in-light of the photodetector. The contrast of black in a green light (line P) is large enough to enable discrimination of the original material though it is inferior to that in a yellow light (line L). An embodiment of the present invention obviates the above-mentioned low contrast of red in a yellow light.

An LED array for an optical reader according to the present invention is illustrated in FIGS. 8(a) and (b). This array comprises a plurality of yellow LED chips 8, each of which is provided with a dome 9 of green or yellow colored transparent material. Another example of the LED array is illustrated in FIGS. 9(a) and (b). This array comprises a continuous cover 10 of green or yellow colored transparent material disposed over the row of chips 8 instead of domes 9.

The contrast characteristics of red and black to white paper in the light from the above-mentioned LED array according to the present invention are graphically depicted in FIG. 10. The abscissa represents the input current per each chip of the LED array, the ordinate represents the contrast to white paper, line Q represents the contrast of the original red material in the light from the light source comprising the yellow domes, line R represents the contrast of the original red material in the light from the light source comprising the green domes, line S represents the contrast of the original black material in the light from the light source comprising the yellow domes, line T represents the contrast of the original black material in the light from the light source comprising the green domes, line L represents the contrast of the original black material in the light from the light source comprising domes of completely transparent material, line M represents the contrast of the original red material in the light from the light source comprising domes of completely transparent material, and line N represents the critical contrast level.

As can be seen from the graph, the contrast of red in the light from the light source provided with domes of yellow or green (line Q or R) was increased as compared with the contrast of red in the light from the light source provided with completely transparent domes (line M).

Figure 11:
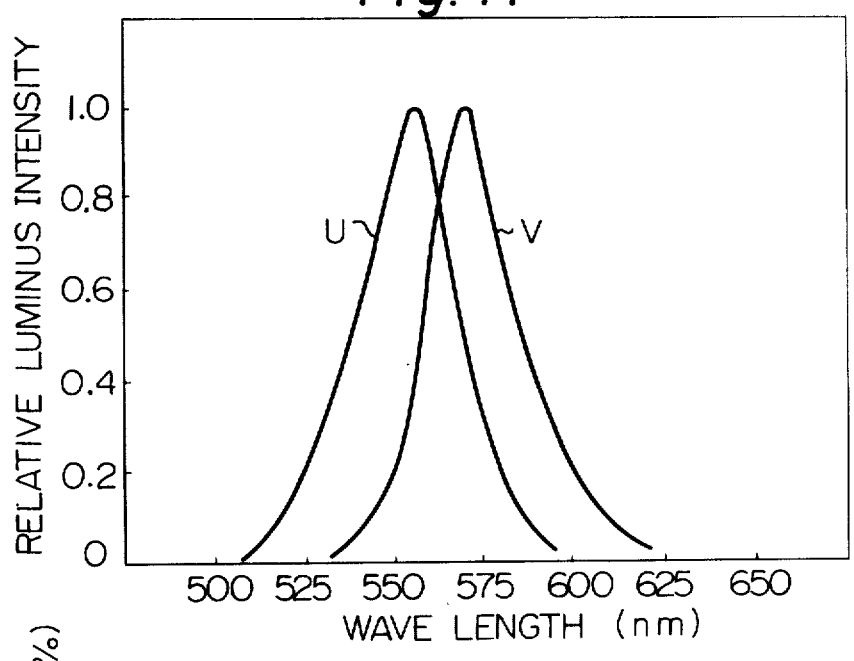
FIG. 11 is a graph showing characteristics of luminous intensity of green and yellow LEDs relative to wavelength.

The reason for this increase in contrast is as follows. The relative luminous intensity of the LED relative to the wavelength is represented in FIG. 11. Line U represents the light of a green LED and line V represents the light of a yellow LED. The green light (line U) contains about 20% of a reddish light component having a wavelength of more than 580 nm, which component degrades the contrast of red. The yellow light (line V) contains about 60% of such reddish light component. The yellow dome removes such reddish light component so that the contrast of red is enhanced. The luminous intensity of the yellow light after the removal of 60% of the reddish light component is still large enough to enable discrimination of the original material since the luminous intensity of the yellow light is primarily very large, as was aforementioned with reference to FIG. 6.

The contrast of black to white paper in the light transmitted through either the yellow or green dome (lines S and T) is sufficiently above the critical level (line N), as represented in FIG. 10.

Figure 12:
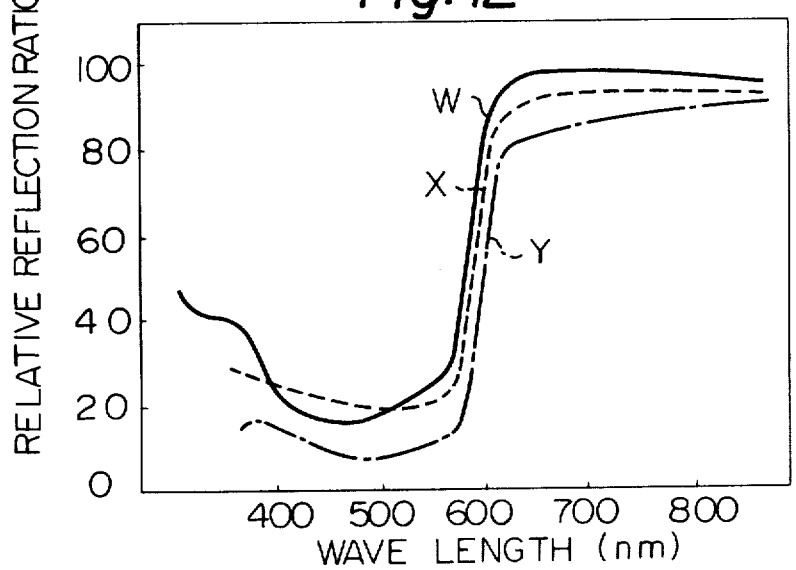
FIG. 12 is a graph showing reflection characteristics of red, and the red of color code No. 6055.

The reflection ratio of various red colors is graphically represented in FIG. 12. Line W represents the red of color code No. 6055, line X represents a reddish orange stamp color, and line Y represents a red color. Line W rises at a wavelength smaller than the wavelength at which line X on Y rises. This means that the red of the color code No. 6055 is the most undiscriminating reddish color when the characteristics of the LED of FIG. 11 are considered. The present invention makes possible enhancement of the contrast of this undiscriminating red, as illustrated in FIG. 10.

As mentioned above, in an embodiment of the present invention, a yellow or green transparent dome or cover is provided over each of the yellow LEDs of the light source so that the contrast of red is enhanced and the reliability of discrimination is upgraded.

Figure 13:
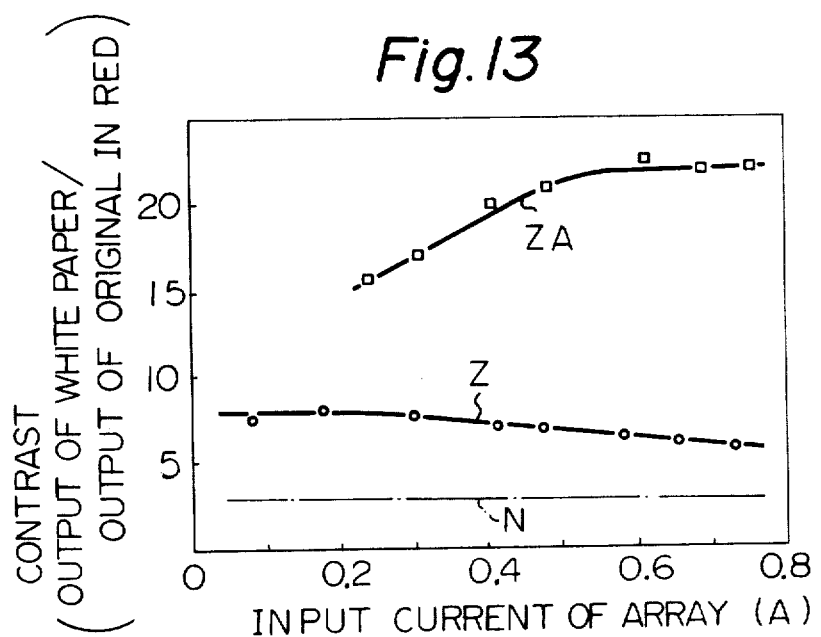
FIG. 13 is a graph showing contrast characteristics of red and green in the light of a conventional light source relative to input current.

Yellow light has advantageous points as a light source for lighting the original material, as was mentioned hereinbefore. However, it has drawbacks as follows. As graphically depicted in FIG. 13, the contrast of red to white paper in a yellow light (line Z) is smaller than the contrast of red in a green light (line ZA). The margin of contrast of red in a yellow light is small since the contrast of line Z is only slightly over the critical level (line N) as compared with the contrast of line ZA. Such a small margin of contrast causes instability in the characteristic of the photodetector when the circumferential temperature changes and incorrect discrimination of the original material due to the low contrast. An embodiment of the present invention obviates this problem.

Figure 14:
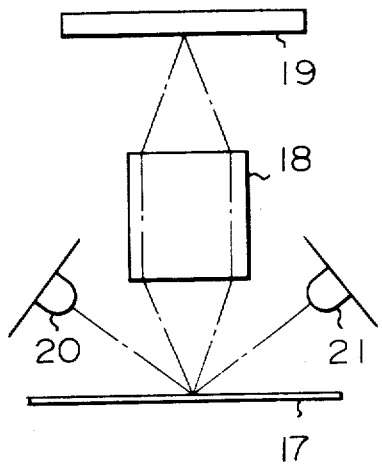
FIG. 14 is a schematic view of an embodiment of an optical reader according to the present invention.
Figure 15:
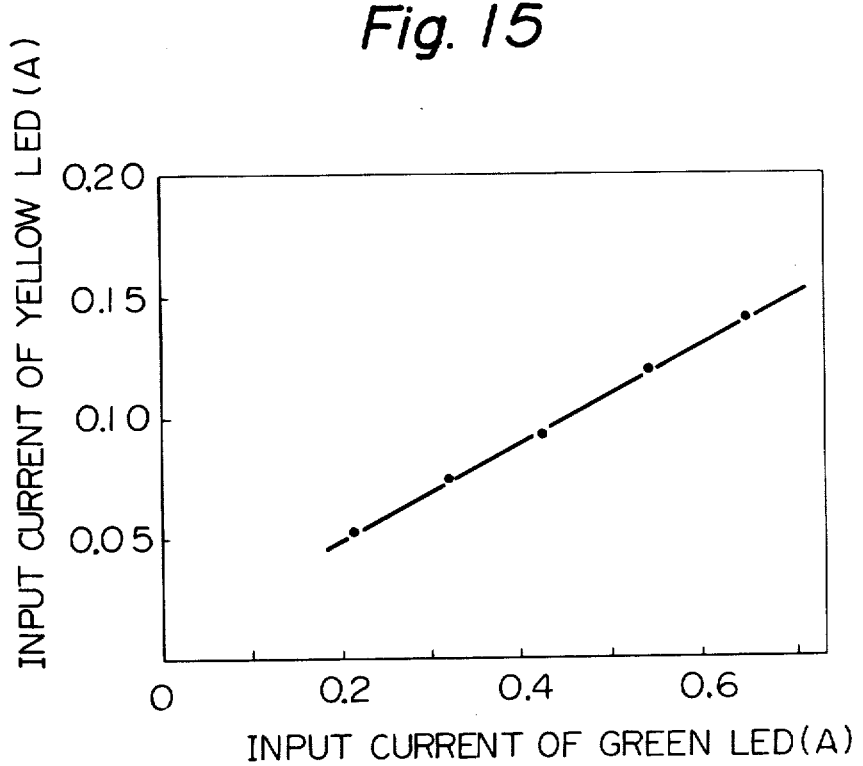
FIG. 15 is a graph showing input current of a yellow LED as compared with input current of a green LED which has the same luminance as the yellow LED.
Figure 16:
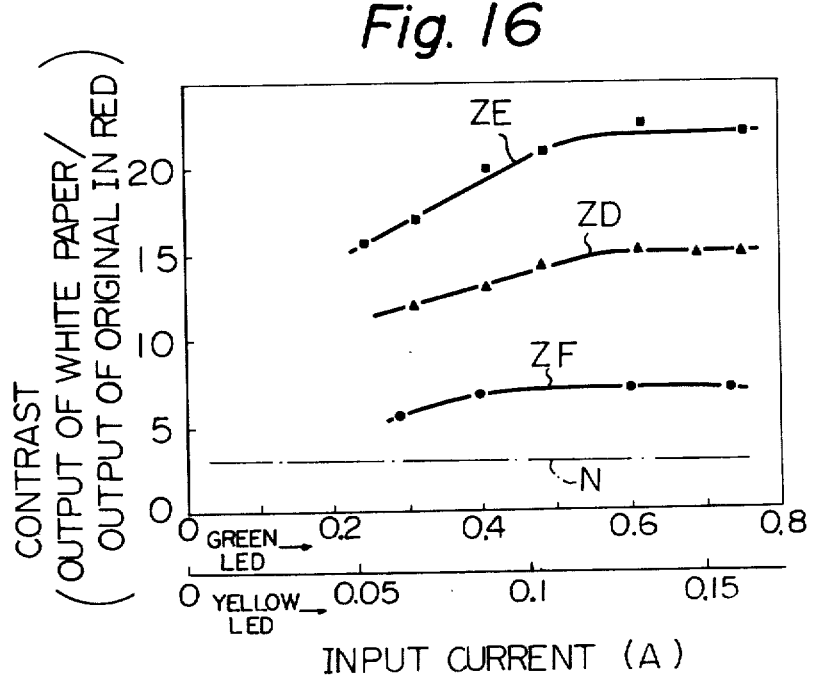
FIG. 16 is a graph showing contrast characteristics of different colors relative to input current.

An example of the construction of the optical reader according to the present invention is illustrated in FIG. 14. An original material 17, a Selfoc lens 18, a photodetector array 19, and two LED arrays 20, 21 are illustrated. One of the arrays 20 which is disposed on one side of the Selfoc lens 18 comprises green LEDs having a center wavelength of 555 nm. The other array 21, which is disposed on the other side of the Selfoc lens 18, comprises yellow LEDs having a center wavelength of 570 nm. The input current fed to these LED arrays 20, 21 is adjusted so that illumination intensity of the yellow LED array is equal to or slightly larger than that of the green LED array. Both of the LED arrays 20, 21 simultaneously light the original material 17. The relation between the input current of the yellow LED and the input current of the green LED is depicted in FIG. 15, both LEDs being of the same luminous intensity. The contrast of red to white in the light of the above-mentioned two LED arrays of the same luminous intensity is represented by line ZD in FIG. 16. The line ZD is sufficiently above the critical line N as compared with the line ZF, which represents the contrast of red in the light of the yellow LED array only. Therefore, although consumption of power is increased as compared with the case of line ZF, the margin of contrast is largely widened so that the stability of discrimination is upgraded when the circumferential temperature changes. The contrast of line ZD is lowered as compared with line ZE, which represents the contrast of red in the light of the green LED array only. However, the line ZD is sufficiently above the critical level N so that reliable discrimination of the original material can be achieved.

Figure 17:
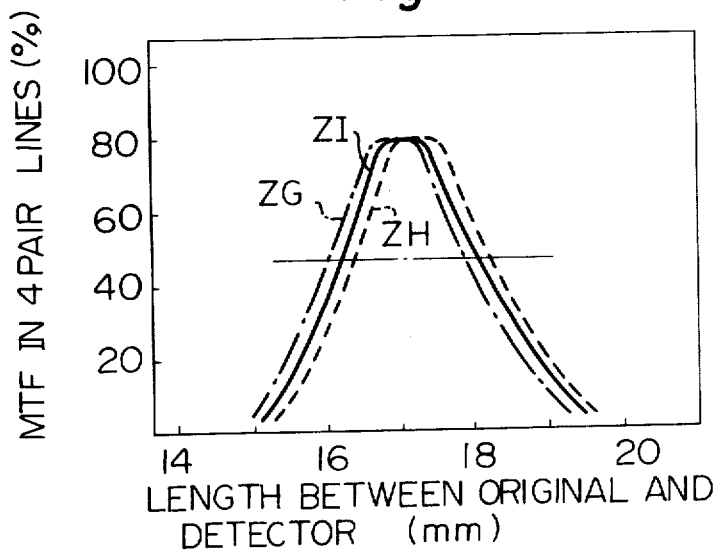
FIG. 17 is a graph showing modulation transfer function (MTF) characteristics of different colors relative to the length between the original material and the detector.

The length between the original material and the photodetector is considered hereinafter from the viewpoint of MTF which corresponds the discriminating power of the photodetector. The graph of FIG. 17 represents the MTF for four pair lines relative to the length between the original material and the photodetector. A Selfoc lens having a 16.7 mm focus was used as the optical guide means. Line ZG represents a green light having a 555 nm wavelength, line ZH represents a yellow light having a 570 nm wavelength, and line ZI represents simultaneous lighting by green and yellow LEDs. An MTF of more than 50% is necessary to obtain reliable discrimination of the original material. As can be seen from the graph, each line has more than ±1 mm of range of length between the original material and the photodetector at an MTF of 50% and the difference between the lines is small. Therefore, the length between the original material and the photodetector in the case of simultaneously using green and yellow LED arrays is almost the same as the length in the case of using a green LED array only. Therefore, it is unnecessary to change the size of the conventional construction when using green and yellow LEDs simultaneously according to the present invention.

As mentioned above, in an embodiment of the present invention, by using a green LED array in addition to a yellow LED array, it is possible to increase the margin of contrast of red to white so that the reliability of discrimination of the optical reader is upgraded.

Figure 18:
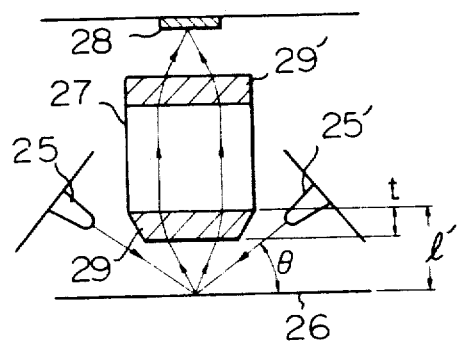
FIG. 18 is a schematic view of an embodiment of an optical reader according to the present invention.

Another example of the optical reader according to the present invention is illustrated in FIG. 18. This optical reader comprises light sources 25, 25', optical guide means 27, a photodetector 28, and color filters 29, 29'. Reference numeral 26 designates an original material. The light from the light sources 25, 25' is reflected onto the original material 26 and passes through the color filter 29, the optical guide means 27, and the other color filter 29' and then is detected by the photodetector 28, which makes an image of the original material 26. The characteristics of the light sources 25, 25' and the color filters 29, 29' will be described later.

Figure 19:
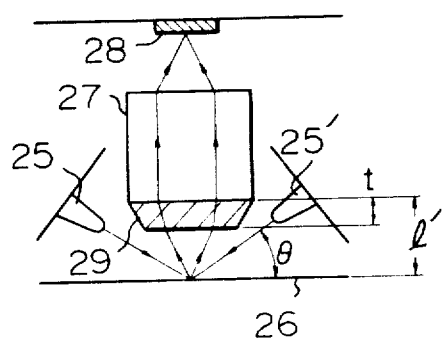
FIG. 19 is a schematic view of another embodiment of an optical reader according to the present invention.

A variation of the above optical reader is illustrated in FIG. 19. Like parts as in FIG. 18 are referred to by like numerals. The construction of FIG. 19 differs from the construction of FIG. 18 in that it comprises only one color filter 29 at the front surface of the optical guide means 27 instead of comprising two filters at both end surfaces of the optical guide means 27.

Figure 20:
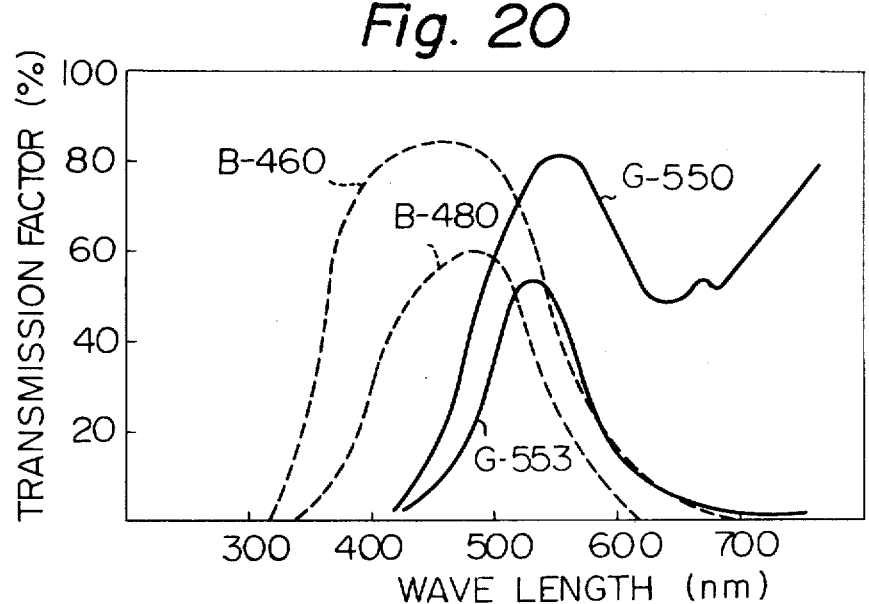
FIG. 20 is a graph showing transmission factors of various color filters according to the present invention.

The characteristic of the transfer factor of the above-mentioned color filter relative to the wavelength is graphically depicted in FIG. 20. Lines B-460 and B-480 represent the characteristics of blue filters, and lines G-550 and G-533 represent the characteristics of green filters.

Figure 21:
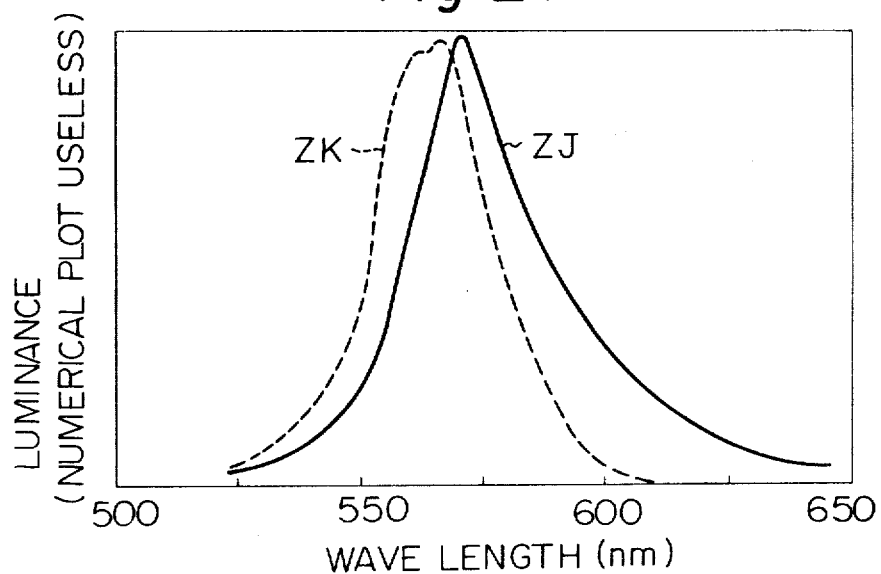
FIG. 21 is a graph showing luminance characteristics of unfiltered light and filtered light of the present invention relative to wavelength.

The characteristic of the light from the light sources of the present invention is graphically depicted in FIG. 21. Line ZJ represents the luminance characteristic of a yellow LED relative to the wavelength, and line ZK represents the luminance characteristic of the light of a yellow LED filtered through a green filter reflected by fine paper. As can be seen from line ZK, the luminance of the light filtered through the green filter is decreased at the portion of the long wavelength near red.

Figure 22:
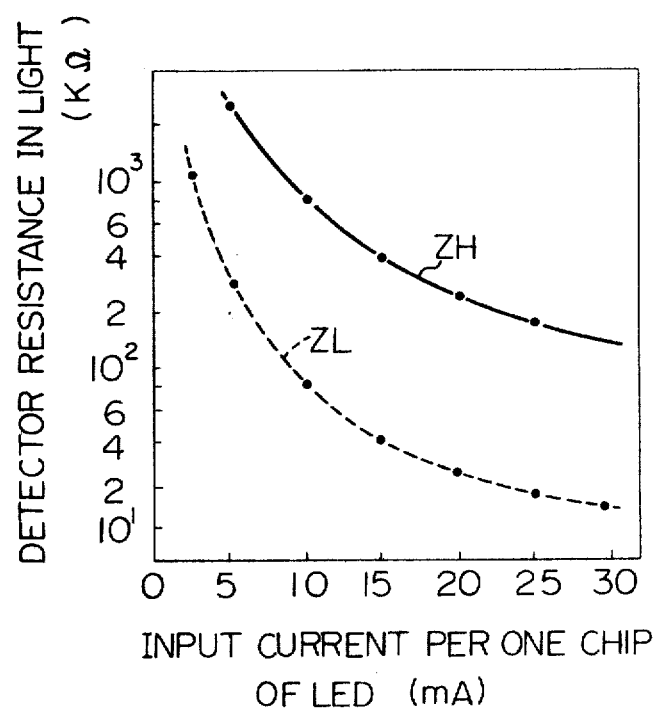
FIG. 22 is a graph showing characteristics of the resistance of the detector in unfiltered light and in light filtered through a green filter.

The detector resistance in light relative to the input current for each chip of the LED array is graphically depicted in FIG. 22 so as to compare the case of a light source without a color filter with the case of a light source with a color filter. Line ZL represents the case of a conventional light source without a color filter, and line ZM represents the case of a light source with a green filter according to the present invention. The photodetector comprises a photoconductive CdSe chip. The original material is a fine paper.

Figure 23:
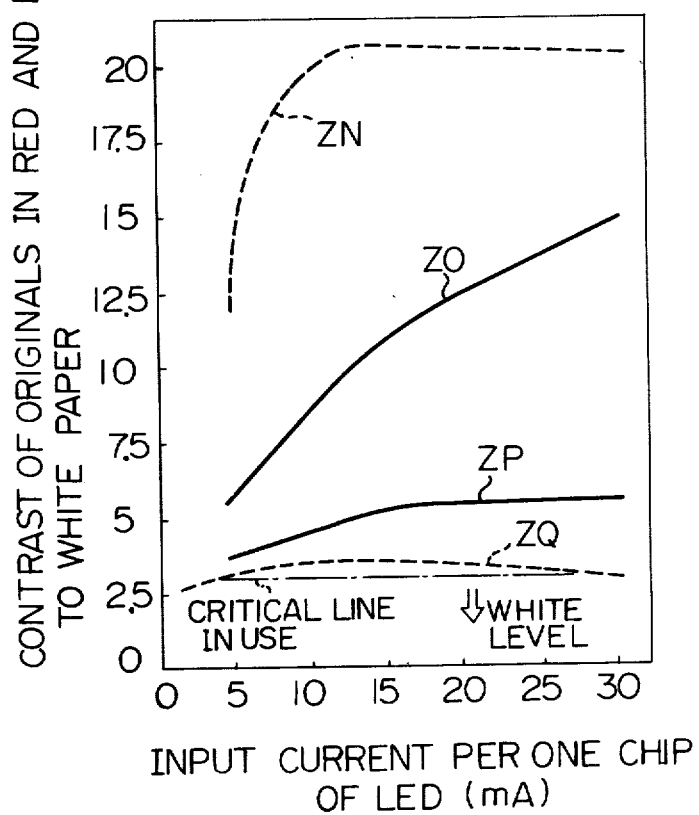
FIG. 23 is a graph showing characteristics of the contrast of red and black colors to white paper relative to input current.

The contrast characteristics of red (color code No. 6055) and black (color code No. 6301) to white paper are graphically depicted in FIG. 23. Line ZN represents black in an unfiltered light, line ZO represents black in a light filtered through the green filter, line ZP represents a red in a light filtered through a green filter, and line ZQ represents red in an unfiltered light.

As previously described with reference to FIG. 21, light filtered through a green filter shifts toward the short wavelength direction because a light component of more than 590 nm is attenuated. This results in a decrease in luminous intensity, which causes an increase in the resistance-in-light as depicted in FIG. 22. Therefore, a large input current is required so as to maintain the reliability of the detector. However, in spite of such a disadvantage, the present invention has an effective feature regarding practical use of the optical reader in that the contrast of red is increased as depicted in FIG. 23, which makes it possible to reliably distinguish graphic material in red near orange (color code No. 6055), which shade of red is the most difficult to discriminate.

The present invention has another advantageous feature as follows.

The length l' (FIG. 18 or 19) between the original material 26 and the optical guide means 27 is defined as follows:

$$l' = l + t\left(1 - \frac{1}{n}\right)$$

wherein l is the length between the original material and the optical guide means of the prior art not provided with a color filter, t is the thickness of the filter and n is the index of refraction of the filter.

The value of l' is larger than l since n is usually 1.5~1.7. Therefore, it is possible to widen the angle of incidence $\theta$ so that the light from the light source is effectively used since the reflection light component in the direction perpendicular to the original material increases.

We claim:
1. An optical reader comprising:
at least one yellow LED array as a monocolor light source for lighting the original material; an optical guide means for guiding the reflected light reflected upon the original material; and an image sensor for changing said reflected light to binary signal waves for discriminating marks of various colors on the original material as black and for discriminating the background of the original material as white in accordance with whether or not the contrast between the reflected light from said background is more than a critical level.

2. An optical reader according to claim 1, wherein said yellow LED array comprises LEDs having a 560~580 nm center wavelength.

3. An optical reader according to claim 1, wherein said yellow LED array comprises a plurality of yellow LED chips and wherein said reader further comprises a plurality of domes of yellow or green transparent material covering said corresponding yellow LED chips.

4. An optical reader according to claim 1, further comprising a continuous cover of yellow or green transparent material for covering said yellow LED array.

5. An optical reader according to claim 1, further comprising at least one green or blue filter provided on said optical guide means for attenuating a light having a wavelength of more than 590 nm.

6. The optical reader of claim 5, wherein said image sensor comprises a photodetector array.

7. The optical reader of claim 5, wherein said optical guide means comprises optical fibers with one end surface facing the original material and another end surface facing the image sensor, and wherein a color filter is positioned on the end surface facing the original material.

8. The optical reader of claim 7, wherein a color filter is positioned on the end surface facing the image sensor.

9. The optical reader of claim 7, wherein said image sensor comprises a photodetector array.

* * * * *

UNITED STATES PATENT AND TRADEMARK OFFICE
CERTIFICATE OF CORRECTION

PATENT NO. : 4,471,384

DATED : Sep. 11, 1984

INVENTOR(S) : Sato et al.

It is certified that error appears in the above-identified patent and that said Letters Patent is hereby corrected as shown below:

```
Front page [56] References Cited, insert:
    --4,288,701    9/1981    Hill
        FOREIGN PATENT DOCUMENTS
        2748266    12/1979   West Germany
        2631848    1/1978    West Germany
         322686    6/1957    Switzerland
        1303657    1/1973    Great Britain
            OTHER PUBLICATIONS
    IBM TECHNICAL DISCLOSURE BULLETIN, Vol. 22, No. 4,
    September 1979: "Transmissive document sensor"
    pages 1585-1586--.

Column 3, line 55, "represents" should be --presents--.
Column 4, line 65, delete ")" (first occurrence).
Column 8, line 37, "1'" should be --$\ell$'--;
Column 8, line 49, "1'" should be --$\ell$'--; "1" should be --$\ell$--.
```

Signed and Sealed this

Twenty-third Day of April 1985

[SEAL]

Attest:

DONALD J. QUIGG

Attesting Officer

Acting Commissioner of Patents and Trademarks